(12) United States Patent
Reichart et al.

(10) Patent No.: US 7,657,567 B2
(45) Date of Patent: Feb. 2, 2010

(54) METHOD AND SYSTEM FOR REWRITING A DATABASE QUERY

(75) Inventors: Donald Reichart, San Antonio, TX (US); Pradeep Sathyanarayan, San Diego, CA (US); Ahmad Ghazal, Redondo Beach, CA (US)

(73) Assignee: Teradata US, Inc., Miamisburg, OH (US)

( * ) Notice: Subject to any disclaimer, the term of this patent is extended or adjusted under 35 U.S.C. 154(b) by 341 days.

(21) Appl. No.: 11/612,019

(22) Filed: Dec. 18, 2006

(65) Prior Publication Data

US 2008/0154841 A1 Jun. 26, 2008

(51) Int. Cl.
*G06F 17/00* (2006.01)
(52) U.S. Cl. .................. 707/104.1; 707/101; 707/102; 707/103 R; 707/202; 707/203; 707/204; 707/205
(58) Field of Classification Search ............... 707/1–10, 707/100–104.1, 200–206
See application file for complete search history.

*Primary Examiner*—Isaac M Woo
(74) *Attorney, Agent, or Firm*—Steve McDonald

(57) ABSTRACT

The invention relates to a method and database system for rewriting a SQL query having at least one null sensitive expression (NSE) in a select list of the query, the query comprising at least one outer join command to be performed on at least two tables and involving a view or a Derived Table (DT). The method comprising the steps of: identifying at least one unmatching row belonging to the view or DT using non-nullable fields that belong to the outermost table in the view or DT; converting the NSE(s) from the at least one identified rows into a SQL case construct; and performing the at least one outer join. The database system comprising means for rewriting a SQL query having at least one null sensitive expression (NSE) in a select list of the query, the query comprising at least one outer join command to be performed on at least two tables and involving a view or a Derived Table (DT). The system comprises a device configured to identify at least one unmatching row belonging to the view or DT using non-nullable fields that belong to the outermost table in the view or DT; a device configured to convert the NSE(s) from the at least one identified rows into a SQL case construct; and a device configured to perform the at least one outer join.

16 Claims, 2 Drawing Sheets

METHOD AND SYSTEM FOR REWRITING A DATABASE QUERY

TECHNICAL FIELD

The present invention relates to methods and systems for rewriting database queries, and in particular databases using Structured Query Language (SQL).

BACKGROUND ART

Relational database systems store data in tables organised by columns and rows. The tables typically are linked together by "relationships" that simplify the storage of the data and make complex queries against the database more efficient. SQL is a standardised language for creating and operating on relational databases. An example of a SQL program product is "TERADATA"(RTM) owned by NCR Corporation.

Rewriting SQL queries is particularly useful for improving their efficiency when the views or Derived Tables (DTs) involved in the queries are "folded". "Folding" a view or DT query means the query is rewritten without reference to the view or DT. However, the folding of some queries can produce incorrect results. For example, the folding of a query having outer joins (full, right or left) and where at least one of the views or the DTs used in the query has a null sensitive expression (NSE), can result in the NSE being incorrectly replicated. NSEs are expressions containing constants, case expressions, zeroifnull expressions or the SQL coalesce function. In prior art methods, expressions (including NSEs) are executed, or instantiated, during the last step of the query. Therefore, the NSE should be null if it belongs to the unmatching rows of the view or DT, however there is no way to determine this after the joins have been made.

This problem is illustrated in the following Example 1, where the NSE is a constant expression:

EXAMPLE 1

Three tables t1, t2 and t3 are populated with the data indicated below.
CT t1 (a1 int not null, b1 int not null, c1 int not null);
CT t2 (a2 int not null, b2 int not null, c2 int not null);
CT t3 (a3 int not null, b3 int not null, c3 int not null);
INS INTO t1 (1,1,1);
INS INTO t2 (1,1,1);
INS INTO t2 (2,2,2);
INS INTO t3 (1,1,1);
INS INTO t3 (2,2,2);
INS INTO t3 (3,3,3);
REPLACE VIEW v21 (av21, bv21, cv21) AS
SELECT t2.a2, t1.a1, 100
FROM t2 LEFT OUTER JOIN t1
ON t2.b2=t1.b1;

The view "v21" is an outer join view and the expression "100" indicated above is the NSE. This expression is denoted as an NSE because the behavior of this expression is determined to be null sensitive when the view is used as an inner table of an outer join operation as can be seen below:

SELECT t3.a3, v21.av21, v21.bv21, v21.cv21
FROM t3 LEFT OUTER JOIN v21
ON t3.a3 = v21.av21
ORDER BY 1;
*** Query completed. 3 rows found. 4 columns returned.
*** Total elapsed time was 1 second.

| a1 | av21 | bv21 | cv21 |
|----|------|------|------|
| 1  | 1    | X    | 100  |
| 2  | 2    | ?    | 100  |
| 3  | ?    | ?    | ?    |

As can be seen in the above example, the view "v21" is being used as an inner table of the left outer join in the immediate query block. By Relational Data Base Management System (RDBMS) principles, a "view" is considered as a "table". In order to get the correct results, the view is materialized into a spool. In other words, the tables t2 and t1 are left outer joined first and then t3 is left outer joined with the result spool (t2 left join t1). This kind of a join operation gives very limited choices to an SQL optimizer in terms of join planning and thus sometimes may result in a bad plan resulting in poor performance. Since correctness of the results takes precedence over performance, the view has to be materialized first. This is because if the view were to be folded i.e. replacing view references by table references inside the query, it would possibly lead to wrong results. After view folding the query would look like:

SELECT t3.a3, t2.a2 AS av21, t1.a1 AS bv21, 100 AS cv21
FROM t3 LEFT OUTER JOIN t2 LEFT OUTER JOIN t1
ON t2.a2 = t3.a3 ON t3.a3 = t2.a2;
The result of the above query would be:
*** Query completed. 3 rows found. 4 columns returned.
*** Total elapsed time was 1 second.

| a3 | av21 | bv21 | cv21 |
|----|------|------|------|
| 1  | 1    | X    | 100  |
| 2  | 2    | ?    | 100  |
| 3  | ?    | ?    | 100  |

Clearly, as can be seen above there is a case of an incorrect result in row number 3 of column cv21, whose result reads "100", whereas it should be null.

The following Example 2 illustrates a similar problem where the view has a case expression NSE:

EXAMPLE 2

CT t1(a1 integer, b1 integer);
INS t1(1,1);
INS t1(2,1);
CT t2(a2 integer, b2 integer);
INS t2(1,1);
REPLACE VIEW v12(av12, bv12, cv12) AS
SEL a2, b2, CASE WHEN (a2 IS NULL)
    THEN 2
    ELSE a2
    END
FROM t2;
SEL t1.a1, t1.b1, v12.av12, v12.cv12
FROM t1 LEFT OUTER JOIN v12
ON t1.a1 = v2.bv12
ORDER BY 1;
When v12 is folded, the query is re-written as
SEL t1.a1, t1.b1, t2.a2 as av12,
    CASE WHEN (a2 IS NULL)
    THEN 2
    ELSE a2
    END as cv12

-continued

```
FROM t1 LEFT OUTER JOIN t2
ON t1.a1 = t2.b2
ORDER BY 1;
*** Query completed. 2 rows found. 4 columns returned.
*** Total elapsed time was 1 second.
```

| a1 | b1 | av12 | cv12 |
|----|----|------|------|
| 1  | 1  | 1    | 1    |
| 2  | 1  | ?    | 2    |

The value of cv12 is incorrect in the 2nd row. The correct value is null (displayed as "?") since it is an un-matching row of the outer join, however it is shown incorrectly as "2".

SUMMARY OF THE INVENTION

According to a first aspect of the invention there is provided a method for rewriting a SQL query having at least one null sensitive expression (NSE) in a select list of the query, the query comprising at least one outer join command to be performed on at least two tables and involving a view or a Derived Table (DT), the method comprising the steps of:

identifying at least one unmatching row belonging to the view or DT using non-nullable fields that belong to the outermost table in the view or DT;

converting the NSE(s) from the at least one identified rows into a SQL case construct; and performing the at least one outer join.

Advantageously, after all joins have been performed, if the value of that field is null, then it is guaranteed that the row originated from a non-matching row of the view. Therefore, all NSEs that belong to the view will be NULL. Otherwise, the row is a matching row and the NSE can be executed as is.

Optionally the at least one NSE is selected from the group comprising a constant expression, case expression, zeroifnull expression or a coalesce function.

Optionally there is provided a step, after the step of performing the at least one outer join, if the value of the field is null, of performing the step of returning a null result.

The step of converting the NSE(s) into a SQL case construct may employ the SQL language CASE WHEN <table>.ROWID is NULL then NULL
ELSE <NSE>
END
where <table> is the outermost table.

Alternatively, the step of converting the NSE(s) into a SQL case construct may employ the SQL language CASE WHEN t1.a1 IS NULL AND t2.a2 IS NULL AND . . . AND tn.an IS NULL
THEN NULL
ELSE <NSE>
END
where t1,t2, . . . ,tn are all tables constituting the view or DT.

According to a second aspect of the present invention, there is provided a database system comprising means for rewriting a SQL query having at least one null sensitive expression (NSE) in a select list of the query, the query comprising at least one outer join command to be performed on at least two tables and involving a view or a Derived Table (DT), the system comprising:

a device configured to identify at least one unmatching row belonging to the view or DT using non-nullable fields that belong to the outermost table in the view or DT;

a device configured to convert the NSE(s) from the at least one identified rows into a SQL case construct; and a device configured to perform the at least one outer join.

Optionally, each of the devices may comprise a computer program, stored on a tangible storage medium, for use in rewriting a SQL query having at least one null sensitive expression (NSE) in a select list of the query, the query comprising at least one outer join command to be performed on at least two tables and involving a view or a Derived Table (DT), the program comprising executable instructions that cause a computer to:

identify at least one unmatching row belonging to the view or DT using non-nullable fields that belong to the outermost table in the view or DT;

convert the NSE(s) from the at least one identified rows into a SQL case construct; and perform the at least one outer join.

BRIEF DESCRIPTION OF THE DRAWINGS

Preferred embodiments of the invention will now be described, by way of example only, with reference to the examples and to the accompanying drawing in which.

DETAILED DESCRIPTION OF THE PREFERRED EMBODIMENTS

Figure 1:
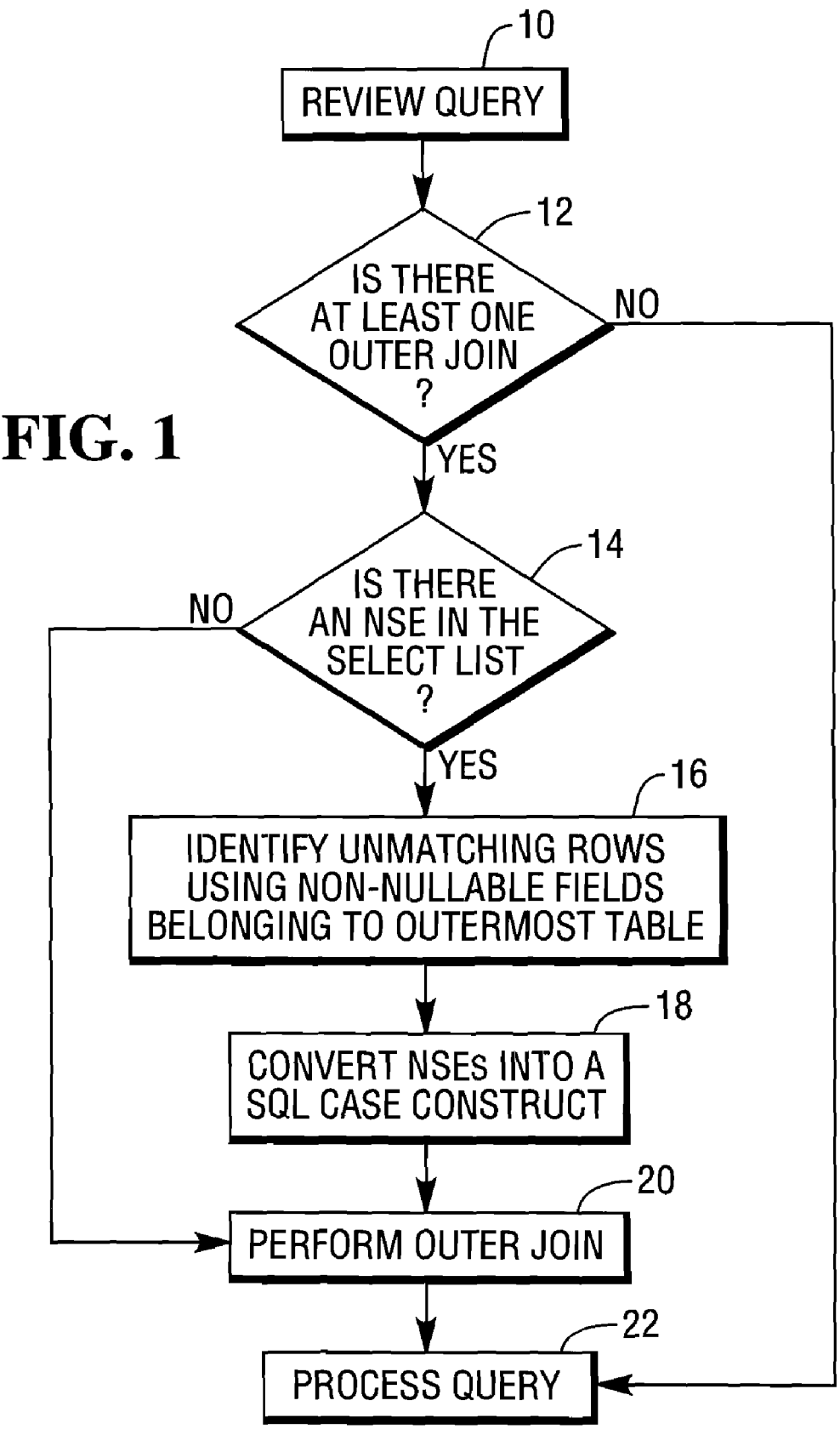
FIG. 1 is a flow diagram illustrating steps of a preferred method embodiment.
Figure 2:
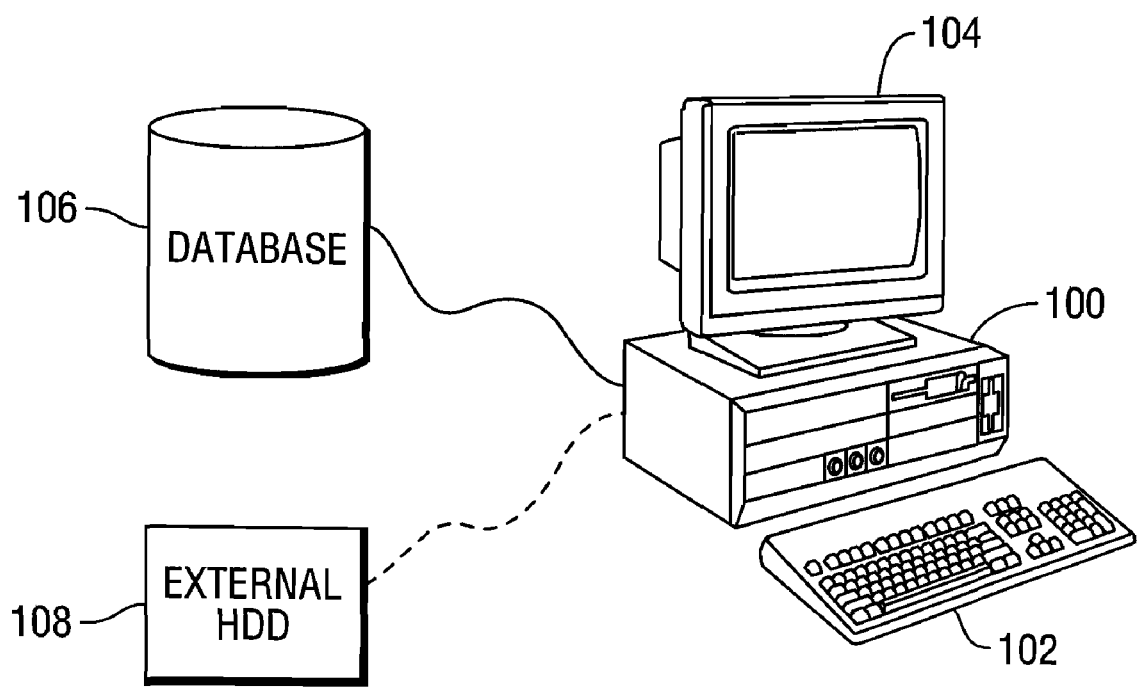
FIG. 2 is a schematic view of an embodiment of a computer system for performing an embodiment of the method of the present invention.

The preferred embodiments aim at least to eliminate the above described problems of the prior art by employing a simple, general and transparent SQL based rewrite. One preferred embodiment is a method for rewriting a SQL query having at least one null sensitive expression (NSE) in a select list of the query, the query comprising at least one outer join command to be performed on at least two tables. Referring to FIG. 1, the preferred embodiment comprises the steps of reviewing the query 10 to check if it has at least one outer join to be performed on at least two tables 12 and whether there is an NSE in the SELECT list 14; identifying at least one unmatching row belonging to a view or a Derived Table (DT) involved in the query using non-nullable fields that belong to the outermost table in the view 16; converting the NSE(s) from the at least one identified rows into a SQL case construct 18; and performing the at least one outer join 20 prior to completing the query 22, if required.

One approach to the step of converting the NSE or NSEs into a SQL case construct is, generally speaking, to convert it as follows:

```
CASE WHEN <table>.ROWID is NULL then NULL
ELSE <NSE>
END
where <table> is the outermost table.
```

Example 2, rewritten in using this approach, becomes as shown in Example 3.

EXAMPLE 3

```
SEL t1.a1, t1.b1, t2.a2 as av12,
CASE (when t2.ROWID is null then NULL else '1' end) as const
FROM t1 LEFT OUTER JOIN t2
ON t1.a1 = t2.b2
ORDER BY 1;
The result of this query is as follows:
*** Query completed. 2 rows found. 4 columns returned.
*** Total elapsed time was 1 second.
```

| a1 | b1 | av12 | cv12 |
|----|----|------|------|
| 1  | 1  | 1    | 1    |
| 2  | 1  | ?    | ?    |

Example 3 illustrates how the problem with the prior art method of Example 2, is corrected; row 2 of cv12 is correctly shown as null ("?").

Example 4 applies the approach of the preferred embodiment on the query from Example 1:

EXAMPLE 4

```
SELECT t3.a3, v21.av21, v21.bv21, v21.cv21
FROM t3 LEFT OUTER JOIN v21
ON t3.a3 = v21.av21
ORDER BY 1;
```

After view folding, the query becomes:

```
SELECT t3.a3, t2.a2 AS av21, t1.a1 AS bv21, 100 AS cv21
FROM t3 LEFT OUTER JOIN t2 LEFT OUTER JOIN t1
ON t2.a2 = t3.a3 ON t3.a3 = t2.a2;
```

On this view folded query, after applying the rewrite, the query looks like:

```
SELECT t3.a3, t2.a2 AS av21, t1.a1 AS bv21, CASE WHEN t2.a2
    IS NULL AND t1.a1 IS NULL THEN NULL ELSE 100 END AS
    cv21
FROM t3 LEFT OUTER JOIN t2 LEFT OUTER JOIN t1
ON t2.a2 = t3.a3 ON t3.a3 = t2.a2;
```

As can be seen in the above rewrite, the NSE "100" has been transformed into a SQL case construct 18. Here the table "t2" happens to be the outermost table and column a2 is also not null. Thus this guarantees that if there is anytime "a2" is null, it would be because of "t2" being an inner table of an outer join operation and under no other circumstances.

Generalizing this example if a view has "n" tables in it with the following definition:

```
CREATE VIEW v (a,b,c) AS SEL <NSE>,
    t1.a1, t2.b2,...,tn.bn FROM t1
<JOIN TYPE> t2 ....<JOIN TYPE> tn ON <cond1> ON
<cond2> .... ON <cond n>
```

The NSE would be transformed as:

```
CASE WHEN t1.a1 IS NULL AND t2.a2 IS NULL AND ....AND
tn.an IS NULL
    THEN NULL
    ELSE <NSE>
    END
    Where t1, t2,...,tn are all the tables constituting the view.
```

The above CASE construct guarantees the correctness of the result and possible performance improvements because it avoids materializing the views and allowing the views to be folded.

In another embodiment, the above CASE construct could be simplified further by reducing the complexity of the conditional expression used in it. This can further enhance the performance during the runtime phase of the query.

By SQL standards, the left outer joins and right outer joins can have one outer table and inner table, while full outer joins can have both the tables as outer and inner tables. In an outer join operation, the inner tables always return nulls for all the non-matching rows. Given this fact, when a view or DT having multiple joined tables inside its definition, all the tables inside the view or DT need to be used in null determination condition if they are not the outermost tables in the view or DT. So the CASE construct condition can be simplified to include only the outermost tables in the joined tables used inside the view or DT. However in the case of inner joins, both the tables will be outer tables, but using only one of the tables in the CASE construct would suffice and would be more optimal in terms of performance.

Using the previously described example, the table "t2" is the outermost table inside the view. The table "t1" is an inner table to the left outer join used inside the view definition. Hence the CASE construct could be rewritten after dropping "t1" from the conditional expression as in Example 5:

EXAMPLE 5

```
SELECT t3.a3, t2.a2 AS av21, t1.a1 AS bv21, CASE WHEN t2.a2
IS NULL
        THEN NULL
        ELSE 100
        END AS cv21
FROM t3 LEFT OUTER JOIN t2 LEFT OUTER JOIN t1
ON t2.a2 = t3.a3 ON t3.a3 = t2.a2;
```

The generalized CASE construct could be simplified as:

```
CASE WHEN <outermost table 1>. <non-nullable column a1> IS NULL
    AND <outermost table 2>.<non-nullable column a2> IS NULL
AND ... AND <outermost table n>.<non-nullable column an> IS NULL
    THEN NULL
    ELSE <NSE>
END
```

This solution can work for all types of outer joins and there is no need to materialize the view at upfront anytime. Example 6 illustrates this embodiment.

EXAMPLE 6

Where we have a view:

```
CREATE VIEW V (a,b,c) AS SEL 10 * 1000, a1, b2
                FROM t1 FULL OUTER JOIN t2 LEFT
                     OUTER JOIN t3
                ON b2 = b3 ON a1 = a2;
```

And we have a query:
SELECT a4, a FROM t4 LEFT OUTER JOIN V ON b4=b;
The query after the folding of the view "V" and rewrite of the NSE would be:

```
SELECT a4, CASE WHEN t1.a1 IS NULL AND t2.a2 IS NULL
              THEN NULL
              ELSE 10 * 1000
              END AS b
   FROM t4 LEFT OUTER JOIN t1 FULL OUTER JOIN t2 LEFT
OUTER JOIN t3
     ON b2 = b3 ON a1 = a2 ON a4 = a1;
```

As can be seen in the Example 6, "t1" and "t2" are outermost tables in the joined tables inside the view "V". Here it is assumed that columns used for null determination condition are "NOT NULL" by definition.

It could be possible that all the columns involved in the outermost table(s) are NULLABLE. Then a derived column which is not NULLABLE would need to be used. For example if t1.a1 is NULLABLE and t2.a2 is NULLABLE, the above CASE construct could be rewritten as shown in Example 7.

EXAMPLE 7

```
SELECT a4, CASE WHEN t1.ROWID IS NULL AND
t2.ROWID IS NULL
              THEN NULL
              ELSE 10 * 1000
              END AS b
   FROM t4 LEFT OUTER JOIN t1 FULL OUTER JOIN t2 LEFT
OUTER JOIN t3
     ON b2 = b3 ON a1 = a2 ON a4 = a1;
```

Here t1.ROWID and t2.ROWID are derived columns in the table "t1" and "t2" which carry the row identifier information of the table. These columns are guaranteed to be non-nullable.

Given below is the pseudo code of implementing the above logic. PROCEDURE Transform_NSE (IN OUT QueryStatement)

```
BEGIN
   For each table in the FROM clause of the QueryStatement
   {
       If (Table is a View or DT)
       {
           If (View or DT involved in Outer Join)
           {
```

-continued

```
               If (View or DT has NSE in SELECT list)
               {
                   If (View or DT involved as Inner table)
                   {
                       Get the definition of the view or DT.
                       Get the outermost tables in the
                       view or the DT.
                       For each Expression in the
                       SELECT list of the view or the DT
                       {
                           If (Expression is NSE)
                           {
                               Rewrite the NSE as a
                               SQL construct
                               CASE WHEN
                               <outermost tab>.<non-nullable field>
                                   IS NULL
                                   THEN NULL
                                   ELSE NSE
                           }
                           Move to the next expression in
                           the SELECT list
                       }
                   } /* View or DT involved as Inner table */
               } /* View or DT has NSE in SELECT list */
           } /* If the View or the DT involved in Outer Join */
           Fold the view or the DT into the QueryStatment
       } /* If the table is View or the DT */
       Move to the next table in the FROM clause of the QueryStatement
   }
END
```

Advantageously, the solution of the preferred embodiments does not require any changes to an SQL optimiser which may be employed in performing the query. Also, this solution allows folding of views or DTs with NSEs involved in full outer joins and/or having full outer joins inside their definition whereas the known approach mandated the materialisation of the views if the views or DTs were involved in full outer joins and/or having full outer joins inside their definition.

It will be appreciated that the above described embodiments can be implemented by a system of computer hardware and software. An embodiment of computer and other hardware which may implement the above described embodiments is illustrated in FIG. 1. FIG. 1 illustrates a computer 100 having a standard hardware configuration comprising a hard disk drive (HDD), bus, external data input means (for example a floppy disc drive, serial port, parallel port, USB port or firewire port) and central processing unit (CPU). Input means in the form of a computer keyboard and/or a mouse 102 is/are connected to the computer 100 to input information, and to instruct the CPU to execute a program loaded thereon. One such program is a program for executing SQL functions. A visual display unit (VDU) 104 is connected to the computer 100 to display information relating to the or each program being run on the computer 100. A database 106 containing information which is extracted and sorted by the SQL program and which can employ the above described SQL case construct embodiments is connected to the computer 100. Information may be input to the database via the keyboard 106 and/or loaded therein via a removable storage medium such as an external HDD 108, a USB flash memory storage device, or a 3.5" floppy disk. The or another such removable storage medium may also be used to move an executable program, such as a SQL program or case construct as described above with respect to the preferred embodiments, onto the HDD of the computer 100 for later execution.

As will be understood, in alternative arrangements, the database may be contained on the HDD of the computer 100, or the computer 100 may be connected to the database 106 via a network, such as a local area network (LAN) or the internet. Alternatively, the computer 100 may also connect via a network to a server which runs, based on commands input to the computer 100 by a user via the keyboard 102, the SQL program and/or the case construct of the above described embodiments.

While the invention has been described in reference to its preferred embodiments, it is to be understood that the words which have been used are words of description rather than limitation and that changes may be made to the invention without departing from its scope as defined by the appended claims.

The claims defining the invention are as follows:

1. A method for rewriting a SQL query having at least one null sensitive expression (NSE) in a select list of the query, the query comprising at least one outer join command to be performed on at least two tables and involving a view or a Derived Table (DT), the method comprising the steps of:
   identifying, by a computer system, at least one unmatching row belonging to one of the view and DT using a non-nullable field that belongs to an outermost table in the view or DT;
   converting, by the computer system, the NSE(s) from the at least one unmatching row into a SQL case construct; and
   performing, by the computer system, the at least one outer join.

2. The method of claim 1 wherein the at least one NSE is selected from the group comprising a constant expression, case expression, zeroifnull expression or a coalesce function.

3. The method of claim 1, wherein after the step of performing the at least one outer join and the value of the field is null, performing a step of returning a null result.

4. The method of any preceding claim wherein the step of converting the NSE(s) into a SQL case construct employs the SQL language:

CASE WHEN <table>.ROWID IS NULL THEN NULL
   ELSE <NSE>
   END
   where <table> is the outermost table.

5. The method of any one of claims 1 to 3 wherein the step of converting the NSE(s) into a SQL case construct employs the SQL language:

CASE WHEN t1.a1 IS NULL AND t2.a2 IS NULL AND ... AND tn.an IS NULL
   THEN NULL
   ELSE <NSE>
   END
   where t1,t2,...,tn are all tables constituting the view or DT.

6. A database system comprising means for rewriting a SQL query having at least one null sensitive expression (NSE) in a select list of the query, the query comprising at least one outer join command to be performed on at least two tables and involving a view or a Derived Table (DT), the system comprising:
   a device configured to identify at least one unmatching row belonging to one of the view and DT using a non-nullable field that belongs to an outermost table in the view or DT;
   a device configured to convert the NSE(s) from the at least one unmatching row into a SQL case construct; and
   a device configured to perform the at least one outer join.

7. The system of claim 6 wherein the at least one NSE is selected from the group comprising a constant expression, case expression, zeroifnull expression or a coalesce function.

8. The system of claim 6 comprising a device configured to perform a step of returning a null result if the value of the field is null.

9. The system of any one of claims 6 to 8 wherein the converting device is configured to employ the SQL language:

CASE WHEN <table>.ROWID IS NULL THEN NULL
   ELSE <NSE>
   END
   where <table> is the outermost table.

10. The system of any one of claims 6 to 8 wherein the converting device is configured to employ the SQL language:

CASE WHEN t1.a1 IS NULL AND t2.a2 IS NULL AND ... AND tn.an IS NULL
    THEN NULL
    ELSE <NSE>
    END
    where t1,t2, ...,tn are all tables constituting the view or DT.

11. The system of claim 6, wherein the device configured to identify at least one unmatching row, the device configured to convert the NSE(s), and the device configured to perform the at least one outer join each comprise a computer.

12. A computer program, stored on a tangible storage medium, for use in rewriting a SQL query having at least one null sensitive expression (NSE) in a select list of the query, the query comprising at least one outer join command to be performed on at least two tables and involving a view or a Derived Table (DT), the program comprising executable instructions that cause a computer to:
    identify at least one unmatching row belonging to one of the view and DT using a non-nullable field that belongs to an outermost table in the view or DT;
    convert the NSE(s) from the at least one unmatching row into a SQL case construct; and
    perform the at least one outer join.

13. The program of claim 12 wherein the at least one NSE is selected from the group comprising a constant expression, case expression, zeroifnull expression or a coalesce function.

14. The program of claim 12 wherein, after the step of performing the at least one outer join, performing a step of returning a null result if the value of the field is null.

15. The program of any one of claims 12 to 14 wherein the step of converting the NSE(s) into a SQL case construct employs the SQL language:

CASE WHEN <table>.ROWID IS NULL THEN NULL
    ELSE <NSE>
    END
    where <table> is the outermost table.

16. The program of any one of claims 12 to 14 wherein the step of converting the NSE(s) into a SQL case construct employs the SQL language:

```
CASE WHEN t1.a1 IS NULL AND t2.a2 IS NULL AND . . . AND tn.an IS NULL
    THEN NULL
    ELSE <NSE>
    END
    where t1, t2, . . . , tn are all tables constituting the view or DT.
```

\* \* \* \* \*